(Model.)

W. E. McINTYRE.
CASTER.

No. 246,176.  Patented Aug. 23, 1881.

Witnesses
Fred. G. Dieterich
Jno. A. Madigan

Inventor:
Wm. E. McIntyre
by Louis Bagger & Co.
Attorneys

N. PETERS. Photo-Lithographer, Washington, D. C.

UNITED STATES PATENT OFFICE.

WILLIAM E. McINTYRE, OF OAKWOOD, KANSAS.

CASTER.

SPECIFICATION forming part of Letters Patent No. 246,176, dated August 23, 1881.

Application filed February 14, 1880.

*To all whom it may concern:*

Be it known that I, WILLIAM E. McINTYRE, of Oakwood, in the county of Linn and State of Kansas, have invented certain new and useful Improvements in Casters; and I do hereby declare that the following is a full, clear, and exact description of the invention, which will enable others skilled in the art to which it appertains to make and use the same, reference being had to the accompanying drawings, which form a part of this specification, and in which—

Figure 1:
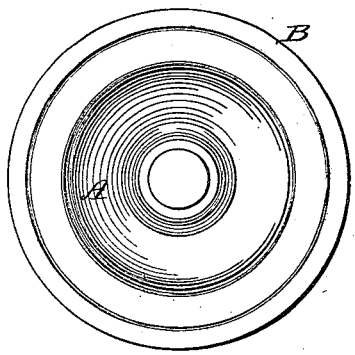
Figure 2:
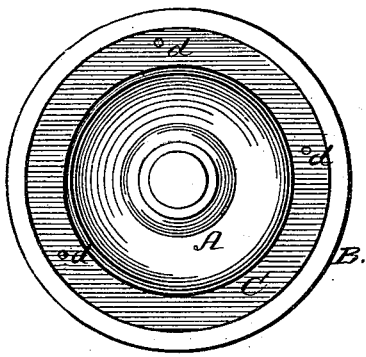
Figure 3:
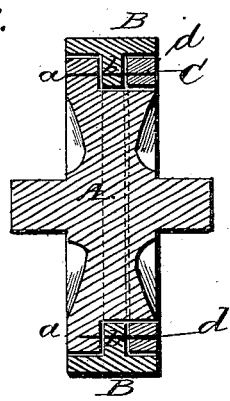

Figures 1 and 2 are side elevations, representing opposite sides of a furniture-caster provided with my improvements, and Fig. 3 is a transverse axial section of the same.

Similar letters of reference indicate corresponding parts in all the figures.

This invention relates to furniture casters or rollers; and it consists in the combination, with the central metallic disk or body of the caster, of a flanged tire made of hard rubber, vulcanized fiber, or any other similar tough material, the object of my improvement being to produce a noiseless caster at a small cost, the rim or tire of which may easily be renewed when worn down without detaching the caster from the piece of furniture upon which it is affixed, substantially as hereinafter more fully set forth.

In the drawings, A is the central disk or body of the caster, the periphery of which is recessed to form a flange, *a*, on one side.

B is the tire, which consists of a circular flat band or hoop, having an inwardly-projecting flange, *b*, which impinges upon the annular flange *a* of disk A.

C is a ring, which is inserted into the tire from the opposite side of disk A, so as to fit around the recessed rim of this and impinge upon the inner central flange, *b*, of the band or tire B. This flange is clamped between ring C and the flanged disk A by screws or rivets *d d d*, so that the several parts or sections A B C will form one compact and solid whole.

By removing the screws or rivets *d* the ring C and disk A may readily be withdrawn from the tire, which may thus be renewed as occasion requires. This makes a very strong, durable, and noiseless caster.

I am aware that rubber cushions have been employed in car-wheels, that truck-wheels and casters have been made in duplex form, the parts held together by screws and adapted to clamp a comparatively narrow strip of rubber in the periphery by friction, and that a threaded disk has been employed to clamp a narrow rubber ring to the wheel-body by friction; but in the two last-mentioned constructions a considerable side pressure and a heavy weight upon the casters (as in bureaus, wardrobes, bedsteads, and like articles of heavy furniture) render the rubber rings liable, from their elasticity, to be forced out of the clamps. My device is designed to obviate this, and to this end the bearing-surface of the tire or rubber is as wide as the caster, as a whole, and the annular flange *b* is pierced by the holding means, rendering displacement impossible.

Having thus described my invention, I claim and desire to secure by Letters Patent of the United States—

The herein-described caster-wheel, composed of the body A, having the peripheral flange *a*, the wide tire B, having the inwardly-projecting annular web or flange *b*, the clamping-disk C, and the securing means *d*, said securing or fastening devices passing through the flange *b* to prevent displacement of the tire, and the whole combined and adapted to serve in relation to a holding-frame, as and for the purposes specified.

In testimony that I claim the foregoing as my own I have hereto affixed my signature in presence of two witnesses.

WILLIAM ELMORE McINTYRE.

Witnesses:
   HENRY S. SHANNON,
   THEODORE HECKMAN.